Jan. 2, 1962 E. R. GARRAWAY 3,015,423
WATER BAG SUPPORT
Filed June 13, 1958
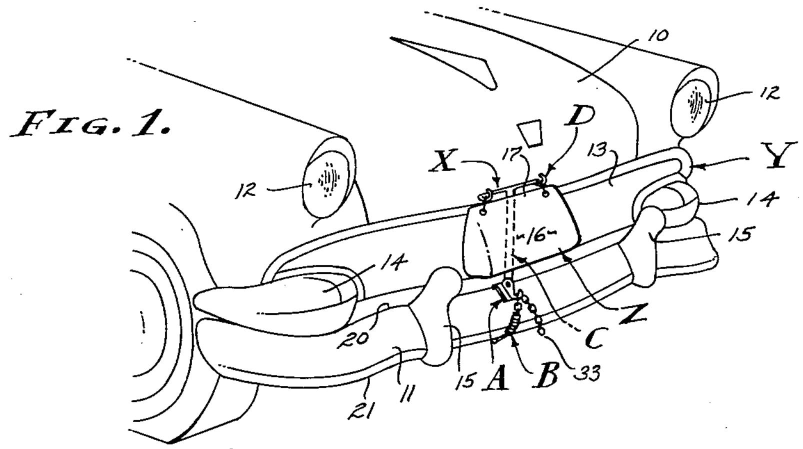
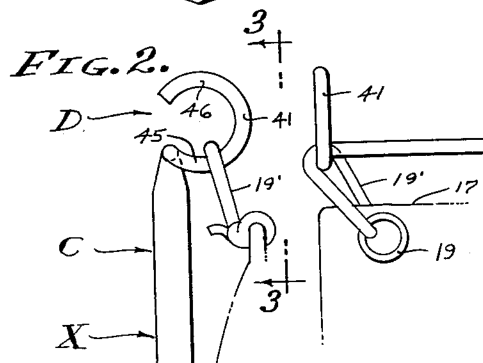
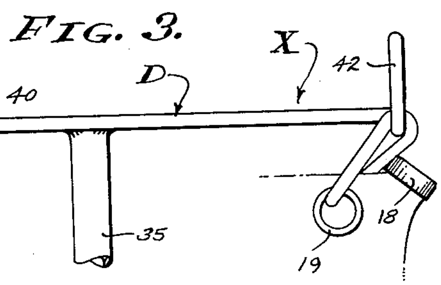
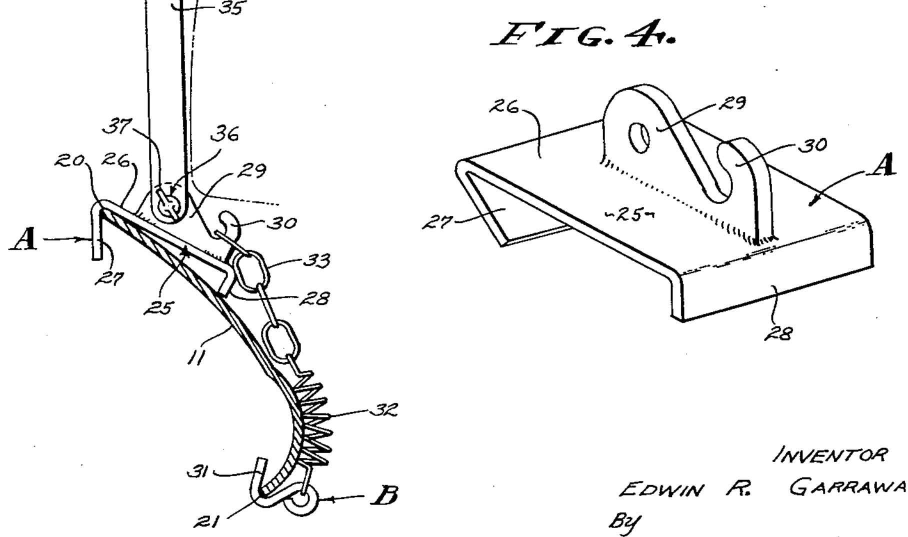

United States Patent Office 3,015,423
Patented Jan. 2, 1962

1

3,015,423
WATER BAG SUPPORT

Edwin R. Garraway, 624 Utah Ave., Victorville, Calif.

Filed June 13, 1958, Ser. No. 741,798
1 Claim. (Cl. 224—42.03)

This invention relates to a water bag support and is concerned in particular with a removable attachment for motor vehicles, and the like, and which is adapted to carry an article such as, for example, a water bag or container.

Motor vehicles are used for transportation over long distances, in which case it is desirable to have a water supply, that is, a supply of drinking water. For this purpose it is common practice to fasten a water bag to the vehicle, from which water can be drawn or used as needed. In practice, the water bag is made of a heavy canvas, or the like, usually reinforced at the top where there is an outlet closed by a stopper. Suitable cords or ties are secured to the water bag, as through eyes or grommets, and these cords or ties are intended to be used to secure the water bag in the desired position.

With the common ordinary water bag, as above set forth, it becomes a problem to carry the water bag on a vehicle. Not only is it a bothersome task to tie and untie the supporting cords, especially when they are wet, but on modern vehicles, such as motor cars, the body parts are such as to be devoid of projections and the like which could be tied to. Furthermore, when a cord, of rope or the like, is tied to a metal part the cord is subject to being chafed away, and as a matter of fact most all parts suitable for tying to are characterized by sharp corners that cut the cords referred to. However, the main problem is the absence of vehicle parts suitable for support of a water bag with the result that said bags are very often carried to depend from a bumper, in which case they often drag upon the ground. This latter problem is emphasized by the fact that vehicles are constructed so low to the ground that a water bag hanging from a bumper is certain to drag, which of course is highly detrimental to the bag.

It is a general object of this invention to provide an improved supporting structure for water bags and the like that is applicable to a motor vehicle.

An object of this invention is to provide a supporting structure for the purpose referred to that is in the form of an attachment and which is adapted to be removably secured to a vehicle. More specifically, the attachment of the present invention is adapted to be secured to a bumper or any like element.

Another object of this invention is to provide a supporting structure for the purpose referred to that is universally applicable to bumpers of vehicles or any other like part thereof, and which is readily installed and/or removed.

It is an object of this invention to provide a supporting structure of the character thus far referred to that is erect and supports a water bag, or the like, above the bumper of the vehicle.

It is still another object of this invention to provide a supporting structure of the character above referred to that is adjustable to carry a water bag or the like at the desired distance from the vehicle body.

2

Further, it is an object of this invention to provide a supporting structure, as above set forth, that readily receives and positions a water bag, or the like, and which is inexpensive of manufacture, which is readily and quickly installed in working condition, and which is reliable in operation.

The various objects and features of my invention will be fully understood from the following detailed description of a typical preferred form and application of my invention, throughout which description reference is made to the accompanying drawings, in which:

FIG. 1 is a perspective view of one end of a typical vehicle and illustrates the installation of the water bag support of the present invention.

FIG. 2 is a side elevation of the support showing it applied to a typical bumper, said bumper being shown in section.

FIG. 3 is a front view of the upper portion of the support, being a view taken as indicated by line 3—3 on FIG. 2.

FIG. 4 is a perspective view of the base element that I provide in connection with the present invention.

The support X that I provide has general utility as applied to the bumper of a motor vehicle Y for the purpose of carrying an article, particularly a water bag Z. As clearly illustrated in FIG. 1 of the drawings, a conventional motor vehicle involves a body 10 that is streamlined and which is generally devoid of any projections. I have shown the front end portion of such a vehicle, it being understood that the rear end portion is the same so far as this invention is concerned. The vehicle Y has a transverse bumper 11 extending across the lower front end portion of the body 10 and said bumper projects forwardly from the body parts, as shown. The front end of the body 10 that lies in a general plane behind the bumper 11 is vertically disposed, and as shown, involves lights 12, a grille 13 and suitable ornaments 14, all as indicated. It will be observed that there is nothing adequate to serve as a tying post or the like. The bumper horns 15 could be used, and are ordinarily used, to tie to for the support of a water bag, but it is apparent that the bag then depends partially or completely below the bumper 11.

The water bag Z that I have illustrated is a typical water bag and involves an envelope 16 of heavy canvas or the like reinforced along its upper margin by a rib element 17. The rib element 17 is a straight element adapted to be horizontally disposed, and there is an opening in the top of the envelope 16 that is closed by a stopper 18. Eyes or grommets 19 are provided, one at each end of the rib element 17, and a suitable length of supporting cord or rope 19' is passed through the grommets to be secured to the supporting object, as later described. It will be apparent how the water bag Z is filled and emptied of water, as desired.

As best illustrated in FIG. 2 of the drawings, the bumper 11 is a contoured element. In the actual manufacture of motor vehicles the bumpers 11 vary widely in size and shape and are usually fabricated of heavy gage sheet metal contoured in both vertical and horizontal cross section. Further, bumpers 11 are usually convex in vertical cross section, or substantially so, and as a result have inwardly turned upper and lower marginal edges 20 and 21. The edges 20 and 21 extend transversely of the vehicle and are other than vertical or horizontally disposed. A typical situation is shown in FIG. 2 where I have shown a case where both marginal edges 20 and 21 are disposed at substantially 45°. The exterior of the bumper 11 is usually polished and coated with a layer of decorative material, for example a layer of polished chrome.

In accordance with the present invention I have provided the support X that is adapted to be installed on a bumper 11 and to carry a water bag Z, or the like. As best illustrated in FIG. 2, the support X involves, generally, a base A, anchoring means B, a standard C, and a header D. The base A is provided to have supporting engagement with the bumper 11, while the anchoring means B secures the base A in working position on the bumper. The standard C is carried by the base A to project upwardly therefrom and the header D is carried at the upper terminal end of the standard for supporting engagement with the water bag Z.

The base A that is provided to have supporting engagement with the bumper 11 is adapted to secure itself to the upper marginal edge 20 thereof. The base A is preferably formed of a body 25 of heavy gage sheet metal and is characterized by a plate portion 26 and by a hooked portion 27 at the upper or rearmost edge of the plate portion 26. As shown, the plate portion 26 is substantially flat, or it can be contoured to lie flat on the exterior of the bumper 11. The hooked portion 27 extends transversely of the plate portion 26 and is formed of the body 25 which is bent or turned down and somewhat rearward to form an acute angle, as shown. Thus, when the base A is urged forwardly the hooked portion 27 wedges and locks onto the edge 20 of the bumper 11.

A feature of construction is the forward margin of the base A that is turned downwardly to engage the exterior of the bumper 11. As shown, the plate portion 26 is flat and there is a downwardly turned flange 28 at the lower and foremost edge of the plate portion 26. The edge of the flange is straight and parallel with the plane of the plate 26 and spaces the plate portion above the exterior of the bumper to clear the contour thereof. It will be apparent that the base A engages the bumper 11 along two lines of support, one at the hooked portion 27, and one at the flange 28, and all to the end that the base A cannot rock.

In addition to the above mentioned features, the base A includes a lug 29 for support of the standard C. The lug 29 is a flat vertically disposed element that projects from the top of the plate portion 26 and which extends in a direction normal to the flange 28. The lug 29 terminates intermediate the front and rear edges of the base A, to the end that a substantial part of the rear portion of the plate 26 is unobstructed. Further, the lug 29 has an upwardly and rearwardly faced hook 30 formed at the foremost portion thereof to form part of or accommodate the anchoring means B, later described.

The anchoring means B is provided to secure the base A in working position on the bumper and is an adjustable means adapted to accommodate itself to a wide variation in bumper construction. As shown, the anchoring means B involves a hook 31, pressure exerting means 32, and adjusting means 33 to tension the means 32. The hook 31 may be any suitable hook for engagement over the lower edge 21 of the bumper 11 and is preferably formed of an elongate element with the rear portion thereof bent back upon itself at an acute angle. The forward portion of the hook is formed with an opening to engage with the pressure exerting means 32.

The pressure exerting means 32 can be any suitable tensioning means and is preferably in the form of a helical tension spring with one end thereof engaged in the opening in the hook 31 and with the other end engaged with the means 33 that adjustably tensions the spring of means 32. The said adjusting means 33 involves an elongate element that is flexible and which has a series of openings therein to be selectively engaged over the hook 30 on the base A. In practice, an ordinary link chain is employed wherein each link forms an adjustment opening. One end of the chain is engaged with the end of the spring of the means 32 and when the desired tension is reached by force exerted manually on the chain, the chain is engaged and secured to the hook 30. By selecting the chain link for engagement with the hook 30, the desired tensioning is obtained whereby the base A is securely held in the working position shown in FIGS. 1 and 2 of the drawings.

The standard C that is carried by the base A to projected upwardly therefrom is a movable or shiftable element adapted to be adjusted to the most desirable position relative to the base A and to the bumper 11. In order to be shiftable the standard C involves a post 35 pivotally secured to the lug 29 by a lock 36. The post 35 is preferably a straight tubular part flattened at its lower end portion to have flat engagement with one side of the lug 29. The lock 36 is in the form of a pin that joins the part 35 to the lug 29 on a horizontal transversely extending axis. The pin is headed at one end and threaded at the other end to carry a nut 37. The nut 37 is a wing type nut that is adapted to be manually turned and clamps the post 35 to the lug 29 when it is tightened on the pin. It will be apparent that the standard C can be selectively positioned, preferably to stand substantially erect, as shown.

The head D that is carried at the upper terminal end of the standard C is adapted to support the water bag Z and as shown in FIGS. 2 and 3 involves a bar 40 and spaced hangers 41 and 42 at opposite ends of the bar. Water bags Z have a substantially uniform width and, therefore, a bar 40 of nominal length is readily established. The bar 40 is a horizontally disposed part fixed to the upper end of the post 35 and it extends transversely of the front of the vehicle X, or parallel with the bumper 11. The bar 40 is made of a suitable length of rod or heavy wire and the end portions thereof are deflected or bent into the configuration of the hangers 41 and 42. The hangers 41 and 42 are alike and each involves a downwardly and forwardly turned leg 45 joined to an upwardly and rearwardly turned lip 46. The throat or entrant opening of the hanger is, therefore, faced upwardly and rearwardly and is adapted to retain a cord or rope 19' that projects or leads forwardly to support the water bag Z.

With the support X that I have fully described in the foregoing description, it is a simple matter to place the base A in the desired position on a bumper 11 and to tension the anchoring means B. With the base A in the desired working position the standard C is adjusted to the most desirable position relative to the base A, preferably to stand erect. The water bag Z is then easily applied to the header D by engaging the cords 19' through the spaced hangers 41 and 42, said cords 19' being suitably tied as circumstances require.

Having described only a typical preferred form and application of my invention, I do not wish to be limited or restricted to the specific details herein set forth, but wish to reserve to myself any variations or modifications that may appear to those skilled in the art and fall within the scope of the following claim:

Having described my invention, I claim:

A support adapted to be secured to a vehicle bumper and the like having a convex surface with spaced upper and lower edges, said support including a base for supporting engagement with the bumper and having a plate portion to overlie the bumper and having a hooked portion at one side to lock with the upper edge of the bumper and having a flange portion at the other side to engage the surface of the bumper to space the plate portion therefrom, anchoring means for yieldingly securing the base in working position including a hook adapted to engage the lower edge of the bumper and further including a pressure exerting means connected to the plate portion and said hook, a standard pivotally joined to the plate portion of the base and a clamp on the base to secure the standard in position to project from the base, and a header on the standard to carry an article.

References Cited in the file of this patent

UNITED STATES PATENTS

| | | |
|---|---|---|
| 1,392,092 | Thompson | Sept. 27, 1921 |
| 1,420,027 | Ehrman | June 20, 1922 |
| 1,435,217 | Davison | Nov. 14, 1922 |
| 1,726,786 | Whitney | Sept. 3, 1929 |
| 2,251,512 | Bush | Aug. 5, 1941 |
| 2,431,108 | Carleton | Nov. 18, 1947 |
| 2,506,090 | Lee | May 2, 1950 |
| 2,518,538 | Giblin | Aug. 15, 1950 |
| 2,518,641 | Roth | Aug. 15, 1950 |
| 2,548,992 | McPherson | Apr. 17, 1951 |
| 2,584,163 | Squires | Feb. 5, 1952 |
| 2,672,264 | Steven | Mar. 16, 1954 |
| 2,742,213 | Johnson | Apr. 17, 1956 |